Patented Aug. 2, 1927.

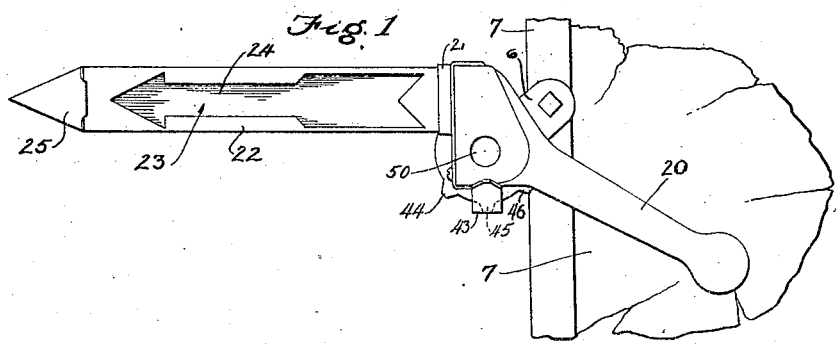
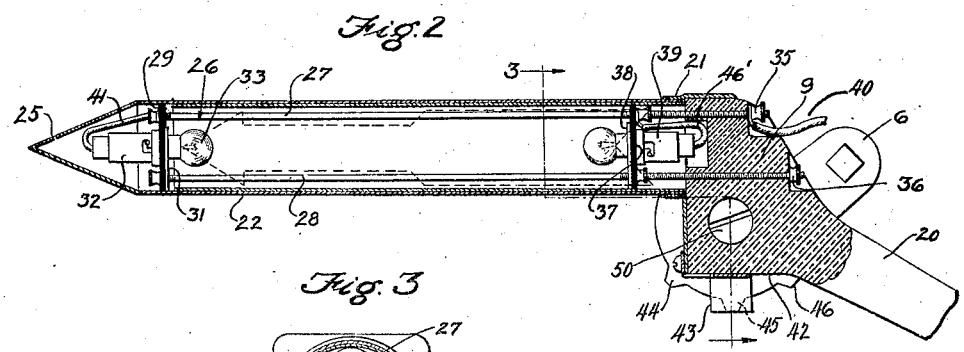
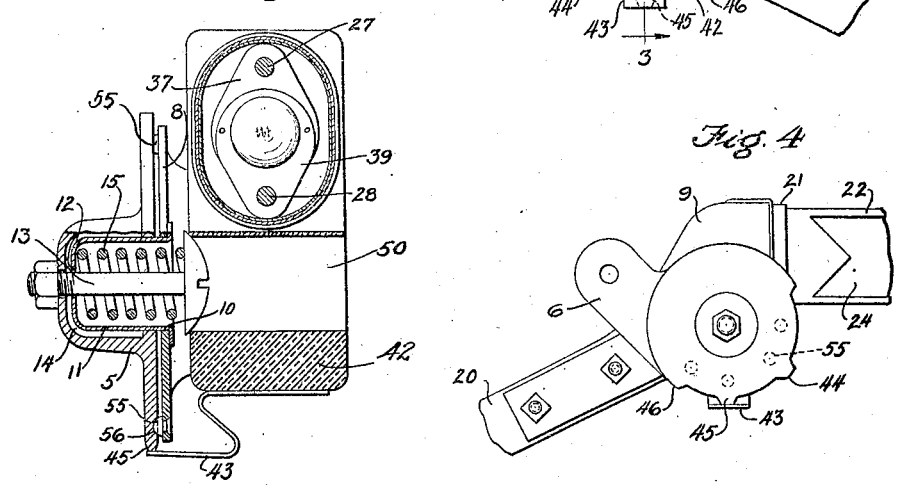
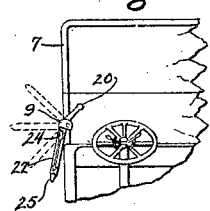

1,637,702

UNITED STATES PATENT OFFICE.

NEWTON W. MATTHEWS, OF FULLERTON, CALIFORNIA.

VEHICLE SIGNAL DEVICE.

Application filed January 14, 1924. Serial No. 686,004.

This invention relates more specifically to a direction signal indicating device for motor driven vehicles.

An important object of this invention is to provide a signal device designed to be conveniently secured to a motor vehicle and manually operated by the driver to give the required signals to the operators of approaching vehicles indicating the direction in which the vehicle is about to turn, or when a stop is to be effected.

Another object is to provide a device in which the signal indicating arm will be automatically lighted when brought into any of its various signalling positions.

A further object is to provide a signalling device for motor vehicles that will be plainly visible when operated to the drivers of vehicles approaching from different directions.

A still further object is to provide a device that is simple in construction, highly efficient in operation, and economical of manufacture.

In the accompanying drawings, I have illustrated and described a preferred embodiment of my invention, it being understood, however, that no limitation is necessarily made to the precise structural details therein exhibited, but various changes, alterations, and modifications may be resorted to within the scope of my invention when desired.

Fig. 1 is a side elevation of the signal attached to a part of the vehicle framework.

Fig. 2 is an enlarged longitudinal section through the device.

Fig. 3 is an enlarged transverse section of the device taken on line 3—3 of Fig. 2.

Fig. 4 is a detail side elevation of the electric switching member.

Fig. 5 is a view illustrating the disposition of the signal on a vehicle.

The motor vehicle act of the State of California requires all drivers of motor vehicles to give hand signals, or their equivalent, indicating the directions in which the vehicle is about to turn, or when it is about to be brought to a stop. The act further states that the turning and stop signals shall be made in the following manner. When the vehicle is about to turn to the right the driver must raise his arm to a substantially vertical position, when a turn to the left is contemplated to extend the arm in a horizontal direction, and when the vehicle is brought to a stop to extend the arm downwardly.

By means of my novel signalling device the above signals may be easily brought into the position desired to indicate the direction in which the turn is about to be made, or when it is to be brought to a stop, the signal in its operation closely resembling the movement made by the driver's arm.

Referring now more specifically to the drawings, 5 designates one part of a switch member formed of cast metal and provided with an attaching arm 6 for securing the switch part in rigid engagement with one of the vertical side rails of the vehicle wind shield 7. Pivotally secured to the center of switch member insulated part 5 is the cooperating part 8 of the latching member that is rigidly secured to the frame 9 of the signal device. Member 8 is provided with a centrally disposed aperture 10 in which is mounted an outwardly projecting thimble 11 provided with an aperture 12 in its end wall for the passage therethrough of an adjusting bolt 13, having a nut on its outer end. Member 5 of the switch is likewise provided with a hollow cap 14 formed integrally therewith in which the thimble chambers when the parts 5 and 8 are assembled in operative relation. A coiled spring 15 is mounted on bolt 13 for the purpose of maintaining the switch member 5 in a resilient adjusted relation to the member 8 secured to the signal frame.

The frame 9 of the signal device is provided with an operating handle 20 extending within convenient reach of the vehicle driver, and a metal socket 21 is formed on the end opposite the operating handle. Secured in socket 21, in any suitable manner, is an elongated tubular enclosing case 22 provided in each of its side walls with oppositely disposed openings 23, here shown in the form of an arrow, and are closed by a sheet of transparent material 24, such as red celluloid. The extreme outer end of the case 22 is provided with a removable conical closure cap 25 to provide convenient access to the interior of the case when desired.

Disposed within case 22 is a lamp carrying frame 26, preferably consisting of a pair of oppositely disposed longitudinally extending rods 27, 28, their inner ends extending through bores formed in the signal frame. Detachably secured to the outer ends of lamp frame rods 27, 28, is a lamp supporting plate 29 formed of an insulating material. Suitably secured by rivets to the outer face of insulating plate 29 is a metallic plate 31 that engages, when the light frame is within the case, the inner surface of the wall of the case. Plates 29 and 31 are provided with apertures in which is mounted a spring light socket 32 of usual construction, the socket carrying an electric lamp 33. The inner ends of rods 27 and 28 extending through the bores in the signal frame are threaded and provided with nuts 35, 36, and mounted on said rods adjacent the frame is an insulating plate 37, having a metallic plate 38 riveted to its outer face. Each of plates 37, 38, are provided with centrally disposed apertures for the reception of a spring lamp socket 39, similar to the lamp socket mounted on the plates secured on the outer ends of the rods.

Rigidly secured to one side 42 of the frame 9, is a switch contact member 43 that engages a plurality of contact points 44, 45, 46, formed on the circular edge of part 5 of the switch member when the signalling device is rotated from one position to another to indicate the direction in which the vehicle is about to turn, or when it is brought to a stop. Frame member 9 is provided with a transversely extending bore 50 by means of which the slotted head of bolt 13 may be engaged by a tool to regulate the tension of the spring 15.

The electrical circuit to the lamp in the signalling device is through line wire 40 that is connected to the vehicle storage battery (not shown), through rod 27, line wire 41 to lamp socket construction 32, from thence through plate 31 to the case 22, and from thence to switch contact 43 formed on the signal frame and grounded on the tubular case. The circuit for lamp socket 39 enters through line 40, rod 27, line wire 46' to lamp socket construction 39, and from thence through plate 38, rod 28, plate 31 and then into the case 22 to complete the circuit.

The operation of my device will be clearly apparent from the following description. When the signal is in its inoperative position it is turned to the position shown in Fig. 5, and should the driver desire to make a left turn he grasps the operating handle 20 and rotates the signal until the lug 45 engages the contact member 43, this will bring the signal to a horizontal position. Should he desire to make a right turn, the signal is rotated until contact lug 46 engages the switch contact 43, thus bringing the signal into a substantially vertical position, as indicated in dotted lines in Fig. 5 of the drawing. Should the operator desire to indicate that the vehicle is about to be brought to a stop, the signal is rotated downwardly until the contact lug 44 engages the contact switch 43, the signal extending and pointing downwardly. The extreme downward position of the signal as shown in full lines in Fig. 5 illustrates its normal position when not in service.

In order that the driver of the vehicle may operate the signal and bring the same to the desired signalling position without watching the turning movement of the device, hemispherical bosses 55 are provided on the outer face of cooperating member 8 adjacent its peripheral edge, the bosses engaging hemispherical cavities 56 formed in the opposing face of switch member 5. As the signal is rotated to any one of the desired positions, and as soon as the bosses engage the cavities, the driver will at once be apprised of the fact that the signal arm is in the proper signalling position.

From the above it will be noted that I have provided a signal device that will be plainly visible both night and day to vehicles approaching from various directions.

What I claim is:

A direction indicating signal for vehicles comprising a signal support adapted to be secured to a vehicle, said support including a switch member comprising a disk provided with a plurality of spaced contacts and a plurality of latch elements on one face thereof in radial alignment with the contacts, a pivotally mounted signal arm on said support, a lamp on said arm, a contact on said arm, an insulated latching member carried by said signal arm, said latching member being provided with a plurality of latch elements cooperating with the latch elements on the switch member when said contact on the signal arm is in engagement with any one of the contacts on the switch member.

In witness that I claim the foregoing I have hereunto subscribed my name this 24th day of December, 1923.

NEWTON W. MATTHEWS.